United States Patent [19]

Miyake et al.

[11] Patent Number: 5,065,171
[45] Date of Patent: Nov. 12, 1991

[54] IMAGE SENSOR WITH UNIFORMLY DISPERSED STORAGE CAPACITORS

[75] Inventors: Hiroyuki Miyake; Yoshio Nishihara, both of Kanagawa, Japan

[73] Assignee: Fuji Xerox Co., Ltd., Tokyo, Japan

[21] Appl. No.: 581,915

[22] Filed: Sep. 13, 1990

[30] Foreign Application Priority Data

Oct. 4, 1989 [JP] Japan ................... 1-257945

[51] Int. Cl.$^5$ .............. H04N 5/335; G01D 15/06
[52] U.S. Cl. ........................ 346/154; 358/213.31
[58] Field of Search ............. 346/154; 358/213.31, 358/213.11; 250/578.1

[56] References Cited

U.S. PATENT DOCUMENTS

| | | | |
|---|---|---|---|
| 4,764,682 | 8/1988 | Swartz | 358/213.11 |
| 4,783,842 | 11/1988 | Fuwa | 358/213.11 X |
| 4,797,560 | 1/1989 | Berger et al. | 358/213.11 |
| 4,943,839 | 7/1990 | Kumano et al. | 250/578.1 X |
| 4,953,028 | 8/1990 | Murayama et al. | 358/213.31 |

FOREIGN PATENT DOCUMENTS 63-9358  1/1988  Japan.

*Primary Examiner*—Donald A. Griffin
*Attorney, Agent, or Firm*—Finnegan, Henderson, Farabow, Garrett, and Dunner

[57] ABSTRACT

A thin film transistor driven image sensor. The image sensor has a plurality of photodiodes. Each photodiode is connected to a storage load capacitor through a thin film transistor switching element. The photodiodes are arranged into a plurality of blocks. Each block is read out sequentially in response to a read pulse which activates the thin film transistor switching elements in the block. The storage capacitors are arranged in such a manner that the distance traveled by an electric charge between a photodiode and the associated storage capacitor is constant for each photodiode and the associated storage capacitor.

6 Claims, 4 Drawing Sheets

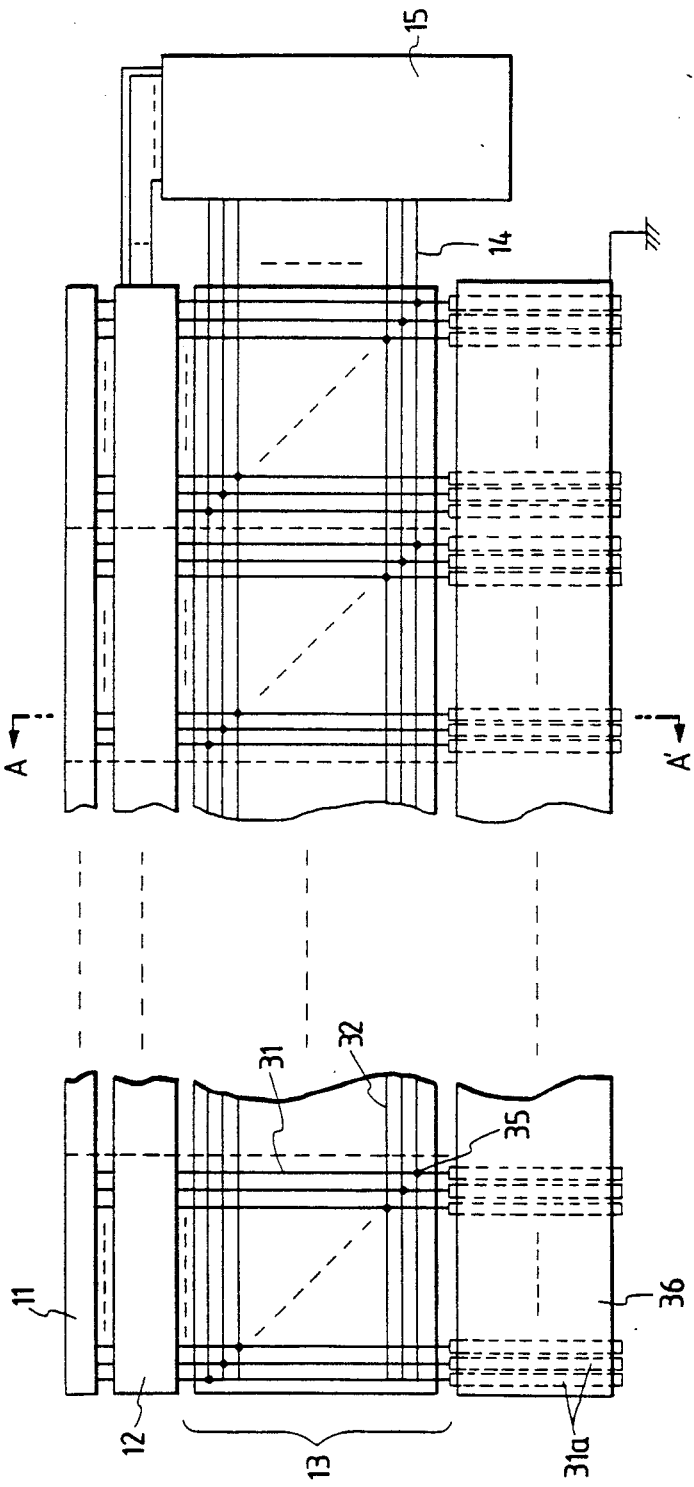
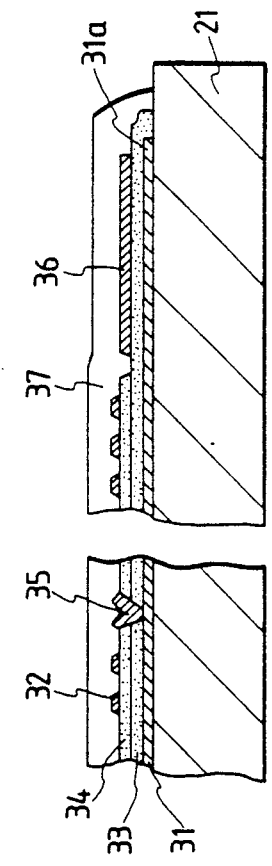
FIG. 3
FIG. 4

IMAGE SENSOR WITH UNIFORMLY DISPERSED STORAGE CAPACITORS

BACKGROUND OF THE INVENTION

1. Field of the Invention

This invention relates to an image sensor for use in such devices as facsimile machines and scanners, and more particularly to an image sensor capable of accurately producing a read signal.

2. Discussion of the Related Art

Thin film transistor (TFT)-driven image sensors are known contact type image sensors. The TFT-driven image sensor projects image data of an original or the like on a one-to-one basis and converts it into an electric signal. The projected image is divided into a number of picture elements. The electric charges generated at the respective photo-receiving elements are temporarily stored by respective load capacitors for a block comprising a predetermined number of photo-receiving elements using thin film transistor switching elements. The electric charges are read as electric signals sequentially and chronologically at speeds of from several hundreds of KHz to several MHz. In the TFT-driven image sensor, the operation of the TFTs allows a single drive IC to read the image data, thus, reducing the number of drive ICs.

The TFT-driven image sensor, whose equivalent circuit diagram is shown in FIG. 6, comprises a line-like photo-receiving element array 51 whose length is substantially the same as the width of an original, an electric charge transfer unit 52 consisting of a plurality of thin film transistors TN,n, whose number corresponds to that of photo-receiving elements 51' on a one-to-one basis, and a multilayer interconnection 53.

The photo-receiving element array 51 is divided into a plurality of N blocks, each block consisting of a plurality of n photo-receiving elements 51'. The plurality of n photo-receiving elements 51' can be expressed equivalently as a photodiode PDN,n. Each photo-receiving element 51' is connected to the drain electrode of a corresponding thin film transistor TN, n. The source electrode of each thin film transistor TN,n is connected to a corresponding common signal line 54 (n lines) and a corresponding load capacitor Cn. Thus, every photo-receiving element block is connected to a load capacitor Cn and a common signal line 54 through the matrix-like connected multilayer interconnection 53.

The gate electrode of each thin film transistor TN,n is connected to a gate pulse generating circuit (not shown). A single line connects each thin film transistor in a block so that each thin film transistor in a block can be turned on simultaneously.

The photoelectric charges generated at each photo-receiving element 51' are stored by the parasitic capacitance of each photo-receiving element 51' and by the overlap capacitance between the drain and gate of the thin film transistor for a predetermined time period. The photoelectric charges are then sequentially transferred to and stored by the load capacitor Cn for every block using the thin film transistor TN,n as a transfer switch. When a gate pulse $\phi$G1 from the gate pulse generating circuit is applied to turn on thin film transistors T1,1 to T1,n of the first block, photoelectric charges generated and stored by the respective photo-receiving elements 51' of the first block are transferred to and stored by the respective load capacitors Cn.

The potentials of the respective common signal lines 54 are changed by the amount of electric charges stored by the load capacitors. The changed voltage values are used to sequentially turn on analog switches SWn within the drive IC 55 to transfer the voltages to an output line 56 chronologically.

By turning on thin film transistors T2,1 to T2,n, through TN,1 to TN,n of the second to Nth blocks by gate pulses $\phi$G2 to $\phi$Gn, the electric charges stored by the photo-receiving elements are transferred for every block and sequentially read. This sequential operation allows image signals to be obtained for every line of the original in a main scanning direction, and the image signals covering the entire original can be obtained by repeating this operation, while advancing the original documents by an original document conveying means (not shown) such as a roller described in Japanese Patent Unexamined Publication No. Sho. 63-9358.

There is a drawback in the image sensor thus constructed. If the load capacitors C1 to Cn are located intensively at one place, as shown by the equivalent circuit diagram in FIG. 6, the length of a line connecting each photo-receiving element and each load capacitor Cn varies with the photo-receiving element block, and this causes variations in resistance, inductance component, and the like, thereby affecting the accuracy with which the electric charges are read. That is, the longer the lines from the photo-receiving elements are, the larger the resistance and the like becomes, thus conversely reducing the electric charges stored by each load capacitor Cn. As a result, even with the same amount of light received, their outputs become erratic, thereby presenting the problem of impairing the output accuracy of the image sensor.

SUMMARY OF THE INVENTION

The present invention has been made in view of the above circumstances and has as an object the provision of an image sensor with improved output accuracy.

A further object of the present invention is the provision of load capacitors whose electric charges are equal when the same amount of light is received.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

These and other objects are achieved by an image sensor comprising a plurality of photo sensors for sensing light and generating an electric charge proportional to the sensed light, a plurality of storage capacitors, each of the storage capacitors being associated with a different one of the photo sensors, and a plurality of switching means for transferring electric charge from the photo sensors to the associated storage capacitors, the photo sensors and storage capacitors being arranged such that the distance traveled by the electric charge between a photo sensor and the storage capacitor associated therewith is constant for each photo sensor and associated storage capacitor.

BRIEF DESCRIPTION OF THE DRAWINGS

The accompanying drawings, which are incorporated in and constitute a part of this specification illustrate embodiments of the invention and, together with the description, serve to explain the principles of the invention. In the drawings.

FIG. 3 is a plan view illustrating multilayer interconnection and a load capacity of the image sensor;

FIG. 4 is a sectional view illustrating the portion taken along the line A—A', of FIG. 3;

DETAILED DESCRIPTION OF THE PREFERRED EMBODIMENTS

As will be described, in the present invention an image sensor having a plurality of photo sensor for sensing light and generating an electric charge proportional to the sensed light is provided. The photo sensors are arranged to form a plurality of blocks of photo sensors. A plurality of storage capacitors, each photo sensor having a storage capacitor associated with the photo sensor, are also provided. The storage capacitors are arranged to form a plurality of blocks of storage capacitors. A plurality of switching means for transferring an electric charge from a photo sensor to the storage capacitor associated with the photo sensor are provided, wherein the distance traveled by the electric charge between a photo sensor and the associated storage capacitor is constant for each photo sensor.

In one embodiment of the invention the number of blocks of photo sensors equals the number of blocks of storage capacitors. In another embodiment of the invention the number of blocks of photo sensors is one greater than the number of blocks of storage capacitors forming a vacant space. A drive circuit may be formed in the vacant space.

According to the present invention, each load capacitor, in which electric charges have conventionally been stored intensively, is equally divided into a plurality of pieces and arranged. The electric charges generated at each photo-receiving element are stored distributively in each equally divided load capacitor. Dividing the load capacitors not only makes the distances of the lines from the photo-receiving elements within each block to their respective load capacitors substantially constant, but also makes the total amount of the electric charges stored in the dispersed load capacitors consistent with no differences in resistance and the like induced by the line length. Therefore, accurate reading of the amount of electric charges is achieved, and the output accuracy of the image sensor is improved.

The load capacitors are equally divided into a plurality of N blocks of photo-receiving elements equidistantly arranged. The electric charges generated at each photo-receiving element are distributively stored by each load capacitor equally divided and arranged in N pieces.

The load capacitors may also be equally divided into a plurality of N−1 blocks of photo-receiving elements equidistantly arranged. The electric charges generated at each photo-receiving element are distributively stored by the load capacitors equally divided and arranged in N−1 pieces. A portion where no load capacitor is present is provided with a drive IC for reading the amount of electric charges. Therefore, the size of the image sensor in the main scanning direction is reduced contributing to the miniaturization of the image sensor.

Figure 1:
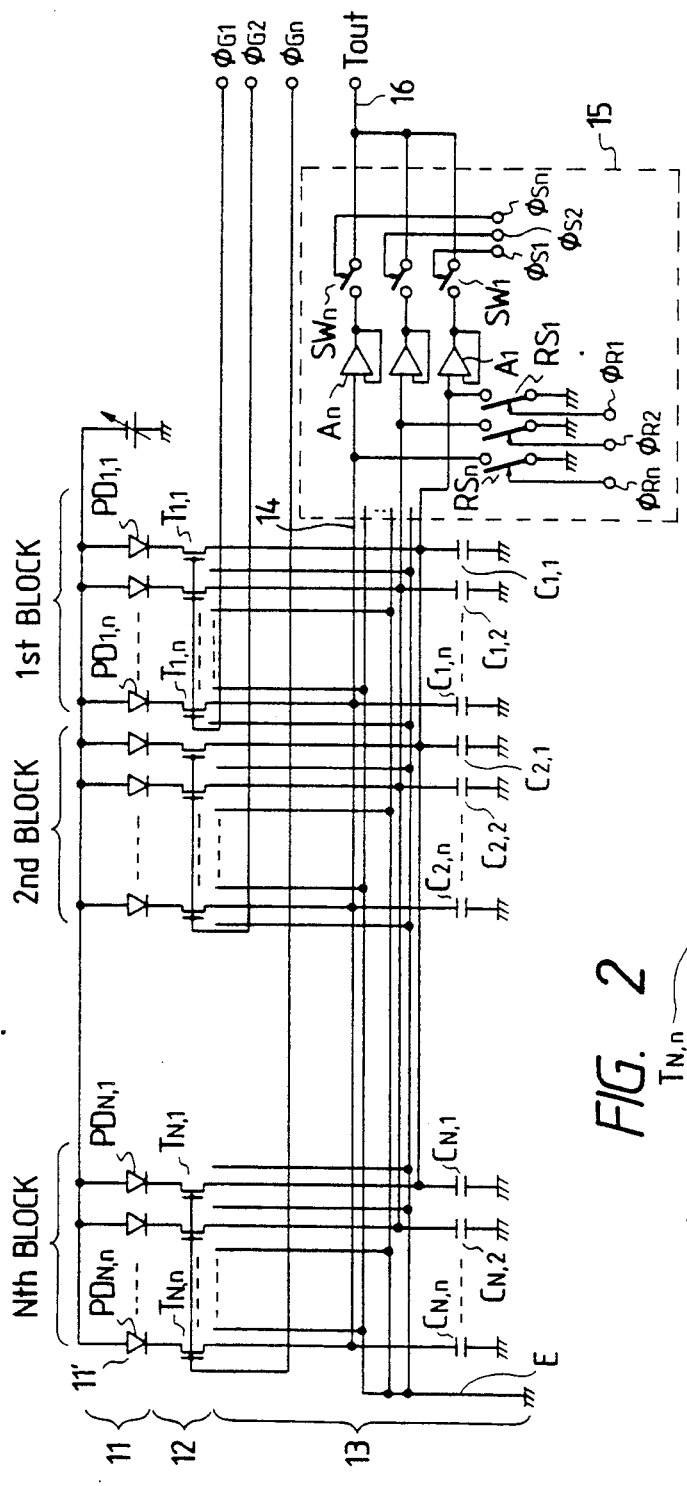
FIG. 1 is a diagram illustrating an equivalent circuit of an image sensor which is an embodiment of the present invention.

FIG. 1 shows an equivalent circuit of the preferred embodiment of the image sensor. A plurality of blocks are formed of a plurality of n sandwich-type photo-receiving elements (photodiode PD) 11' juxtaposed on a substrate made of an insulating material such as glass. A photo-receiving element array 11 (PD1,1 to PDN,n) consists of a plurality of N blocks. An electric charge transfer unit 12 consists of thin film transistors T1,1 to TN,n, each of which is connected to a photo-receiving element 11'. Matrix-like multilayer interconnection 13 includes a ground line E. A plurality of n common signal lines 14 corresponding to the photo-receiving elements within each block extend from the electric charge transfer unit 12 through the multilayer interconnection 13. Analog switches SW1 to SWn within a drive IC 15 are connected to the common signal lines 14. Load capacitors C1,1 to CN,n are arranged between the multilayer interconnection 13 and the common signal lines 14. The ground line E is disposed to prevent crosstalk between lines.

Figure 2:
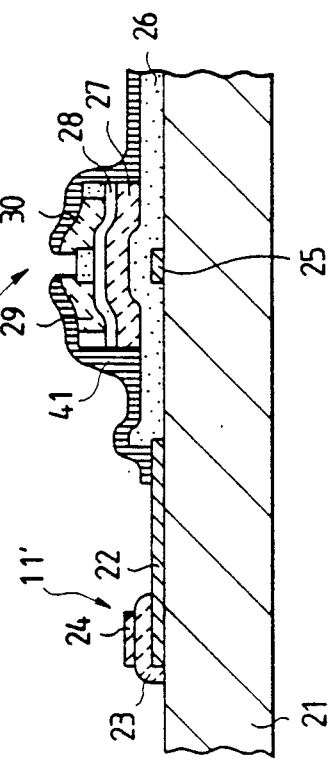
FIG. 2 is a sectional view illustrating a photo-receiving element and an electric charge transfer unit of the image sensor.

A sectional view of a photo-receiving element 11' is shown in FIG. 2. A metal electrode 22 made of a metal such as chromium (Cr) forms a lower individual electrode. A photo conductive layer 23 is made of amorphous silicon hydride (a-Si:H). An upper transparent electrode 24 made of indium-tin oxide (ITO) is sequentially deposited on a substrate 21 made of a material such as glass in the form of a sandwich.

The lower metal electrode 22 is formed by being distributively divided in a main scanning direction. A belt-like photoconductive layer 23 is arranged on the metal electrode 22. The upper transparent electrode 24 is formed so as to serve as a belt-like common electrode. With such an arrangement, the portion of the photoconductive electrode 23 interposed between the metal electrode 22 and the transparent electrode 24 constitutes the photo-receiving element 11'. A block comprising a plurality of photo-receiving elements 11' forms the photo-receiving element array 11'. One end of the metal electrode 22 is connected to the drain electrode of one thin film transistor TN,n of the electric charge transfer unit 12. In the photo-receiving element 11', CdSe (cadmium selenide) or the like may replace the amorphous silicon hydride to form the photoconductive layer.

Each thin film transistor TN,n constituting the electric charge transfer unit 12 is an inversely staggered type transistor having a chromium layer as a gate electrode 25, a silicon nitride film as a gate insulating film 26, an amorphous silicon hydride (a-Si:H) layer as a semiconductor activation layer 27, an n+amorphous silicon hydride (n+a-Si:H) layer as an ohmic contact layer 28, an aluminum layer as a drain electrode 29, and an aluminum layer as a source electrode 30 sequentially deposited on the substrate 21. A line 41 from the metal electrode 22 of the photo-receiving element is connected to drain electrode 29.

The construction of the multilayer interconnection 13 and the load capacitor CN,n will now be described with reference to FIGS. 3 and 4.

The multilayer interconnection 13 comprises a chromium layer serving as a lower longitudinal line 31 and an aluminum layer serving as an upper transverse line 32. Between the longitudinal line 31 and the transverse line 32 is a line layer in the form of a matrix through a first insulating layer 33 made of silicon nitride and a second insulating layer 34 made of polyamide. The construction of the insulating layer in double layer form prevents crosstalk at intersecting line points. Connections of both upper and lower lines are made by contact holes 35.

In order to eliminate variations in the resistance and inductance components of the lines, the length of each of the transverse lines 32 is equal. In order to insure that each line is equally affected by crosstalk occurring between lines of the multilayer interconnection, the number of intersecting points in both upper and lower lines is equal. More specifically, as shown in the left corner portion of the multilayer interconnection 13 of the image sensor of FIG. 3, the transverse lines 32 are extended all the way to the left corner portion to intersect with the longitudinal lines 31.

Each load capacitor CN,n is formed of individual load capacitors C1,1 to Cn,n which are made of chromium. The lower portion of each capacitor C1,1 to CN,n is arranged equidistantly, unified with the longitudinal lines 31, along the extension of the longitudinal lines 31 below the multilayer interconnection 13. The size of each individual load capacitor CN,n is selected by dividing the capacitance of the lo conventional load capacitor Cn (load capacitance required for a single photo-receiving element) by the number N of blocks of photo-receiving elements. More specifically, in the case where the permittivity between electrodes is 3.4, the distance between the longitudinal lines of the multilayer interconnection is ca. 80 $\mu$m; the distance between the adjacent load capacitors CN,n is ca. 10 $\mu$m; the length of the load capacitor CN,n is ca. 4 to 5 $\mu$m, its width, ca. 75 $\mu$m, and its thickness, ca. 1 $\mu$m. An insulting layer is formed on the load capacitors C1,1 to CN,n. Preferably, the insulating layer is formed by extending the first insulating layer 33 made of silicon nitride arranged on the multilayer interconnection 13. On this insulating layer, an upper electrode 36 is formed by depositing aluminum in the form of a belt so as to cover the load capacitors C1,1 to CN,n with no arrangement of the second insulating layer 34.

The lower line 31 and the electrodes 31a arranged on the lower portion of each of the individual load capacitors C1,1 to CN,n are prepared by a photolithographic process, while the upper line 32 and the belt-like upper common electrode 36 arranged on the upper portion of the load capacitors are also formed by a photolithographic process. A protection film 37 is arranged on the multilayer interconnection 13 and load capacitors CN,n thus formed.

A plurality of n common signal lines 14 to be connected to the analog switches SW1 to SWn within the drive IC 15 are formed as a part of the transverse lines 32 of the multilayer interconnection 13. The potential of the common signal lines 14 varies depending on the electric charges stored by the load capacitors C1,1 to CN,n, and such potential value is to be drawn out to the output line 16 (FIG. 1) by the operation of the analog switch SWn.

A method of driving the image sensor which is the embodiment of the present invention will next be described.

Upon injection of light onto an original (not shown) placed on the photo-receiving element array 11 from a light source (not shown), the reflected light is injected onto each photo-receiving element (photodiode PD) to cause electric charges to be generated corresponding to the level of darkness of the original. The generated electric charges are stored by the parasitic capacitance or the like of the photo-receiving element 11'. When the thin film transistor TN,n is turned on upon application of a gate pulse $\phi G$ from a gate pulse generating circuit (not shown), the electric charges stored by the parasitic capacitance are transferred to and stored by the load capacitor Cn by connecting the photodiode PD to the transverse lines 32 of the multilayer interconnection 13. More specifically, this operation will be described in the case where electric charges are generated at the photodiodes PD1,1 to PD1,n of the first block. Upon application of a gate pulse $\phi G1$ from the gate pulse generating circuit, the thin film transistors T1,1 to T1,n are turned on and the electric charges generated at the photodiodes PD1,1 to PD1,n are transferred to and stored by the load capacitors ranging from C1,1 to CN,1 to C1,n to CN,n via the matrix-like multilayer interconnection 13.

The electric charges of the photodiode PD1,1 are transferred to and stored by the load capacitors C1,1 to CN,1; the electric charges of the photodiode PD1,2, by the load capacitors C1,2 to CN,2; and the electric charges of the photodiode PD1,n, by the load capacitors C1,n to CN,n. Thus, the electric charges generated at each photodiode PD are distributively transferred and stored over the entire plurality of distributively formed load capacitors. Therefore, the distance between each photodiode PD and associated load capacitor is constant for each photodiode PD and load capacitor CN,n, thereby eliminating variations in resistance, inductance component, and the like due to differences in line length.

A timing generating circuit (not shown) applies read switching signals $\phi s1$ to $\phi sn$ sequentially to the read switches SW1 to SWn of the drive IC 15 and reset switching signals $\phi R1$ to $\phi Rn$ sequentially to reset switching elements RS1 to RSn of the drive IC 15 with a delay with respect to each read switching signal. Accordingly, the electric charges stored by the load capacitors C1 to Cn are delivered (T out) as image signals. The electric charges generated by each photo-receiving element (photodiode PD) of the next block are then transferred.

According to the image sensor of this embodiment, the conventional load capacitors Cn are equally divided into groups of N blocks. Each load capacitor is substantially the same distance from its associated photo-receiving element. Therefore, the electric charges generated at the respective photo-receiving elements are distributively stored in the equally arranged load capacitors CN,n. The sum total of the distances of the respective lines from the respective photo-receiving elements (n pieces) of each block to the respective load capacitors is constant, and the total amount of the electric charges stored in the dispersed load capacitors is consistent. With no differences in resistance and the like induced by line length, accurate reading of the level of electric charges is achieved, and the output accuracy of the image sensor is improved.

The load capacitor Cn must have a capacitance as large as several hundreds of pF. Therefore, if the insulating layer is used as a dielectric of the load capacitor Cn, a large capacitor area is necessary. Thus, some conventional image sensors have a large area load capacitor in the auxiliary scanning direction increasing the size of the auxiliary scanning direction. In the present invention, the load capacitors are dispersed and equidistantly arranged below the multilayer interconnection 13 along the main scanning direction reducing the size of the load capacitors. Therefore, the size of the image sensor in the auxiliary direction is reduced.

Figure 5:
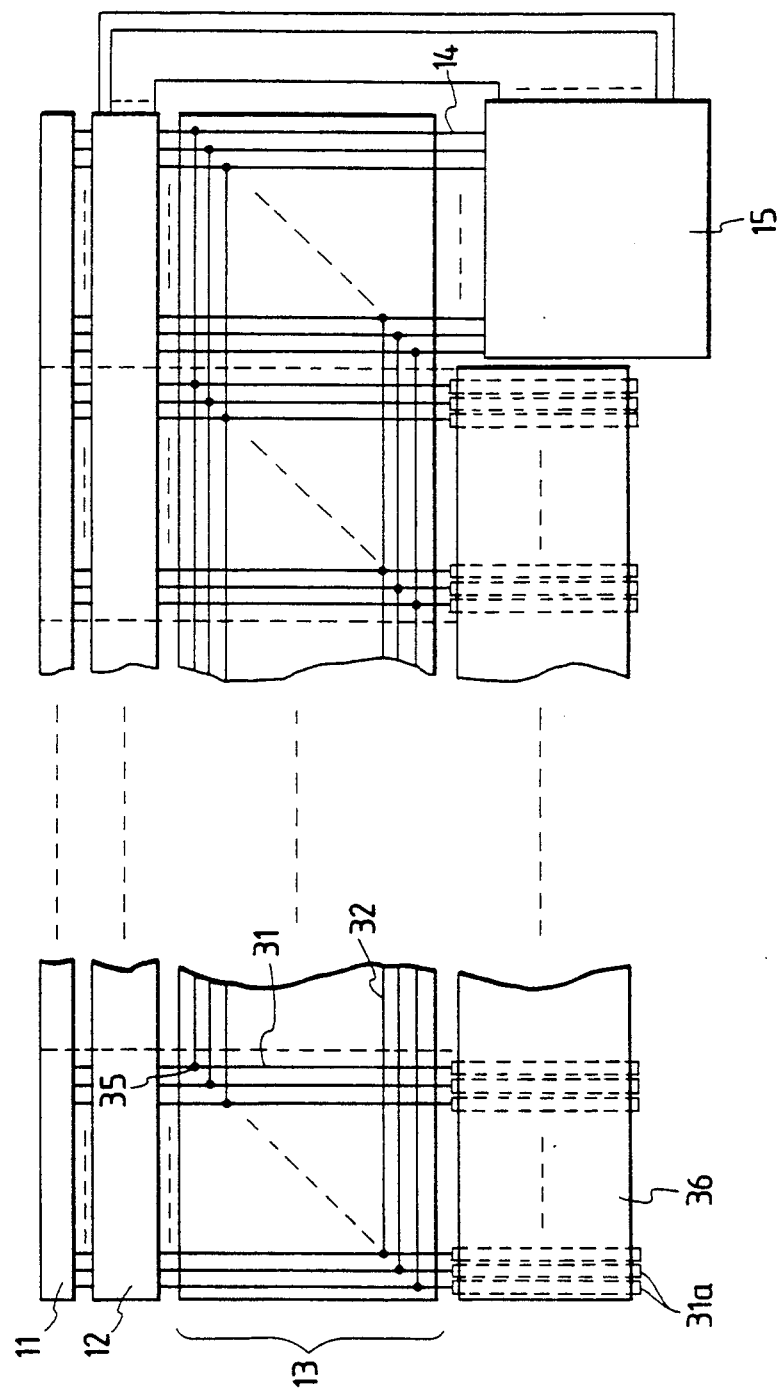
FIG. 5 is a plan view illustrating multilayer interconnection and a load capacity of an image sensor which is another embodiment of the present invention.
Figure 6:
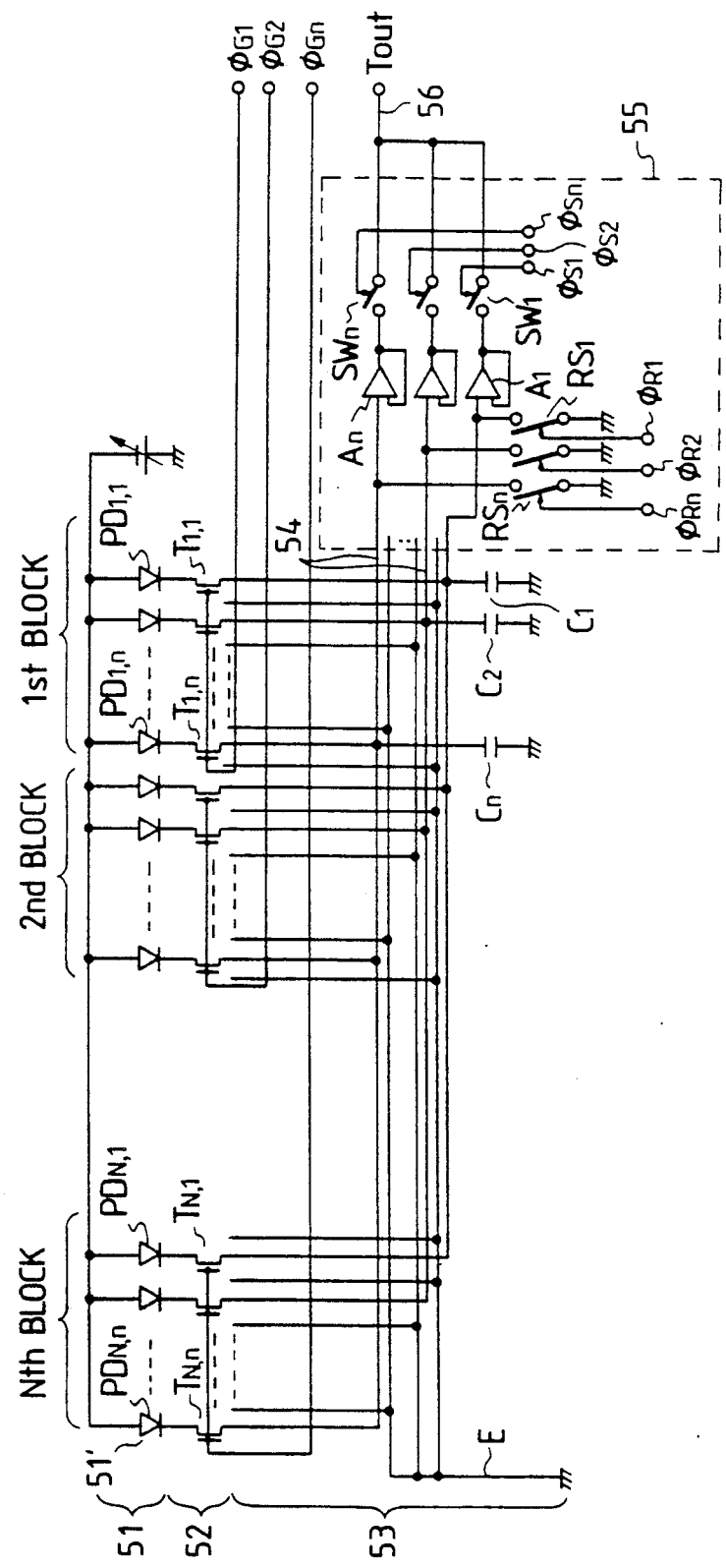
FIG. 6 is an equivalent circuit diagram of a conventional image sensor.

Although the drive IC 15 is preferably arranged outside the main scanning direction of the photo-receiving element array 11 (on the extension of the transverse lines 32) it may also be arranged on the extension of the longitudinal lines 31 as shown in FIG. 5. With such placement, however, part of the load capacitors must be removed, and therefore, the capacitance of each load capacitor CN,n must be a value obtained by dividing the capacitance required for a single photo-receiving element 11' by the number N−1 instead of by the number of blocks N.

The length of the transverse lines 32 must also be constant. In order to reduce crosstalk at intersecting points and to equalize the amount of crosstalk at the intersecting points of the multilayer interconnection 13, the intersecting points at both ends of the transverse lines 32 which are not necessary are eliminated, and both ends of the transverse lines 32 are adjusted as shown in FIG. 5 to make the number of intersecting points equal. With such an arrangement, erratic outputs are eliminated, and the size of the image sensor in the main scanning direction is reduced.

Although the multilayer interconnection 13 is formed of longitudinal lines 31 made of Cr in the lower layer and of transverse lines 32 made of Al in the upper layer in the preferred embodiment, the transverse lines 32 may be made of Al in the lower layer and the longitudinal lines 31 may be made of Cr in the upper layer. The load capacitors must then be arranged so that the lower layer is formed of Cr belt-like electrode and the upper layer of the Al individual load capacitors.

According to the present invention, each load capacitor Cn, in which electric charges have conventionally been stored intensively, is equally divided into a plurality of pieces and arranged. The electric charges generated at each photo-receiving element are stored distributively in each equally divided load capacitor. Dividing the load capacitors not only makes the distances of the lines from the photo-receiving elements within each block to their respective load capacitors constant, but also makes the total amount of electric charge stored in the dispersed load capacitors consistent with no differences in resistance and the like induced by the line length. Therefore, accurate reading of the amount of electric charges is achieved, and the output accuracy of the image sensor is improved.

The load capacitors Cn are equally divided into a plurality of N blocks of photo-receiving elements equidistantly arranged. The electric charges generated at each photo-receiving element are distributively stored by each load capacitor CN,n equally divided and arranged in N pieces.

The load capacitors Cn may also be equally divided into a plurality of N−1 blocks of photo-receiving elements equidistantly arranged. The electric charges generated at each photo-receiving element are distributively stored by the load capacitors CN,n equally divided and arranged in N−1 pieces. A vacant space where no load capacitor is present is provided with a drive IC for reading the amount of electric charges. Therefore, the size of the image sensor in the main scanning direction is reduced contributing to the miniaturization of the image sensor.

The foregoing description of preferred embodiments of the invention has been presented for purposes of illustration and description. It is not intended to be exhaustive or to limit the invention to the precise form disclosed, and obviously many modifications and variations are possible in light of the above teachings or may be acquired from practice of the invention. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. An image sensor, comprising:
   a plurality of photo sensors for sensing light and generating electric charges according to the sensed light, said photo sensors being arranged to from a plurality of blocks of photo sensors;
   a plurality of storage capacitors, each of said storage capacitors being arranged to form a plurality of blocks of storage capacitors;
   a plurality of switching means for transferring electric charge from said photo sensors to said associated storage capacitors;
   a plurality of common signal lines, each of said common signal lines connecting each of said photo sensors with one storage capacitor in each of said blocks of storage capacitors; and
   a drive circuit, connected to said plurality of common signal lines, for sequentially outputting the electric charges stored by said plurality of storage capacitors.

2. An image sensor as claimed in claim 1, wherein the number of blocks of said photo sensors is one greater than the number of blocks of said storage capacitors such that a vacant space is formed in said image sensor.

3. An image sensor as claimed in claim 2, wherein said drive circuit is formed in said vacant space.

4. An image sensor as claimed in claim 1, wherein said photo sensors and storage capacitors are arranged such that the distance traveled by electric charge between a photo sensor and said associated storage capacitors is constant for each photo sensor.

5. An image sensor as claimed in claim 4, wherein the number of blocks of said photo sensors is one greater than the number of blocks of said storage capacitors such that a vacant space is formed in said image sensor.

6. An image sensor as claimed in claim 5, wherein said drive circuit is formed in said vacant space.

* * * * *